US012665851B2

(12) United States Patent
Chen et al.

(10) Patent No.: US 12,665,851 B2
(45) Date of Patent: Jun. 23, 2026

(54) LOAD BALANCING SYSTEM AND METHOD

(71) Applicant: Compal Electronics, Inc., Taipei City (TW)

(72) Inventors: Ching-Yu Chen, Taipei City (TW); Yi-Ching Chen, Taipei City (TW); Ko-Cheng Liu, Taipei City (TW)

(73) Assignee: Compal Electronics, Inc., Taipei City (TW)

( * ) Notice: Subject to any disclaimer, the term of this patent is extended or adjusted under 35 U.S.C. 154(b) by 106 days.

(21) Appl. No.: 18/657,614

(22) Filed: May 7, 2024

(65) Prior Publication Data

US 2025/0254123 A1 Aug. 7, 2025

(30) Foreign Application Priority Data

Feb. 6, 2024 (TW) ................................. 113104744

(51) Int. Cl.
*H04L 47/125* (2022.01)
*H04L 12/28* (2006.01)

(52) U.S. Cl.
CPC ........ *H04L 47/125* (2013.01); *H04L 12/2898* (2013.01)

(58) Field of Classification Search
CPC ......................... H04L 47/125; H04L 12/2898
See application file for complete search history.

(56) References Cited

U.S. PATENT DOCUMENTS 7,940,735 B2    5/2011    Kozisek et al.

FOREIGN PATENT DOCUMENTS

| CN | 116133144 A | * | 5/2023 | ............ H04W 84/18 |
| CN | 111835653 B | | 10/2023 | |
| CN | 118524445 A | * | 8/2024 | ............ H04W 84/18 |
| EP | 2962497 B1 | | 11/2018 | |
| TW | I580227 B | | 4/2017 | |

OTHER PUBLICATIONS

Redhat, "Automatic load balancing for PMDthreads in Open vSwitch with DPDK", 2021 (Year: 2021).*

(Continued)

*Primary Examiner* — Messeret F Gebre

(74) *Attorney, Agent, or Firm* — KIRTON McCONKIE; Evan R. Witt

(57) ABSTRACT

A load balancing system and method is provided. The load balancing system includes a core network, CPEs (customer premise equipments), user equipments, and a load balancing equipment. The CPEs receive signals from the core network and connect to each other through a network topology. The user equipments are connected to the CPEs. The load balancing equipment is connected to one CPE, and the load balancing equipment confirms a throughput limit of each CPE and includes a data analysis module and a processing unit. The data analysis module receives network parameters between the CPEs and the user equipments, and calculates premise throughputs of the CPEs. The processing unit generates a route control table according to the premise throughputs. According to the route control table, the CPEs adjusts signal transmission between the CPEs and the user equipments to balance the premise throughputs of the CPEs.

16 Claims, 5 Drawing Sheets

(56) References Cited

OTHER PUBLICATIONS

T.-H. Wang, Y.-C. Chen, C.-M. Hsu, K.-S. Hsu and H.-C. Young, "Auto scaling of containerized ACSs for CPE management," 2016 18th Asia-Pacific Network Operations and Management Symposium (APNOMS), Kanazawa, Japan, 2016, pp. 1-4 (Year: 2016).*
M. A. Ouamri, G. Barb, D. Singh and F. Alexa, "Load Balancing Optimization in Software-Defined Wide Area Networking (SD-WAN) using Deep Reinforcement Learning," 2022 International Symposium on Electronics and Telecommunications (ISETC), Timisoara, Romania, 2022, pp. 1-6 (Year: 2022).*

* cited by examiner

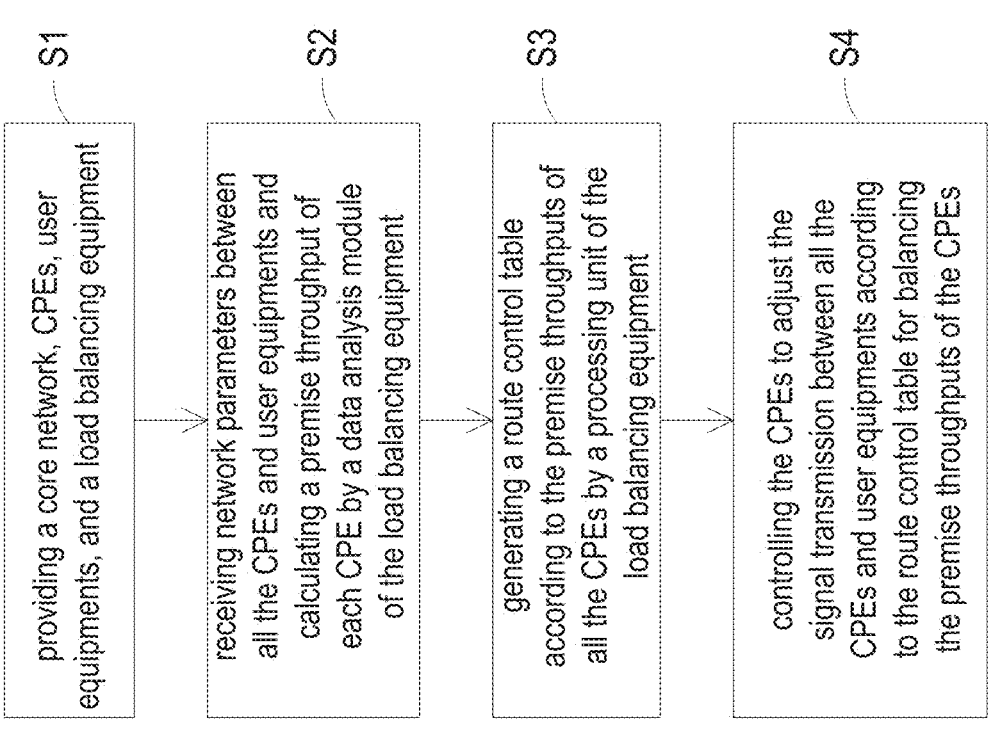

FIG. 2

S1 providing a core network, CPEs, user equipments, and a load balancing equipment

S2 receiving network parameters between all the CPEs and user equipments and calculating a premise throughput of each CPE by a data analysis module of the load balancing equipment

S3 generating a route control table according to the premise throughputs of all the CPEs by a processing unit of the load balancing equipment

S4 controlling the CPEs to adjust the signal transmission between all the CPEs and user equipments according to the route control table for balancing the premise throughputs of the CPEs

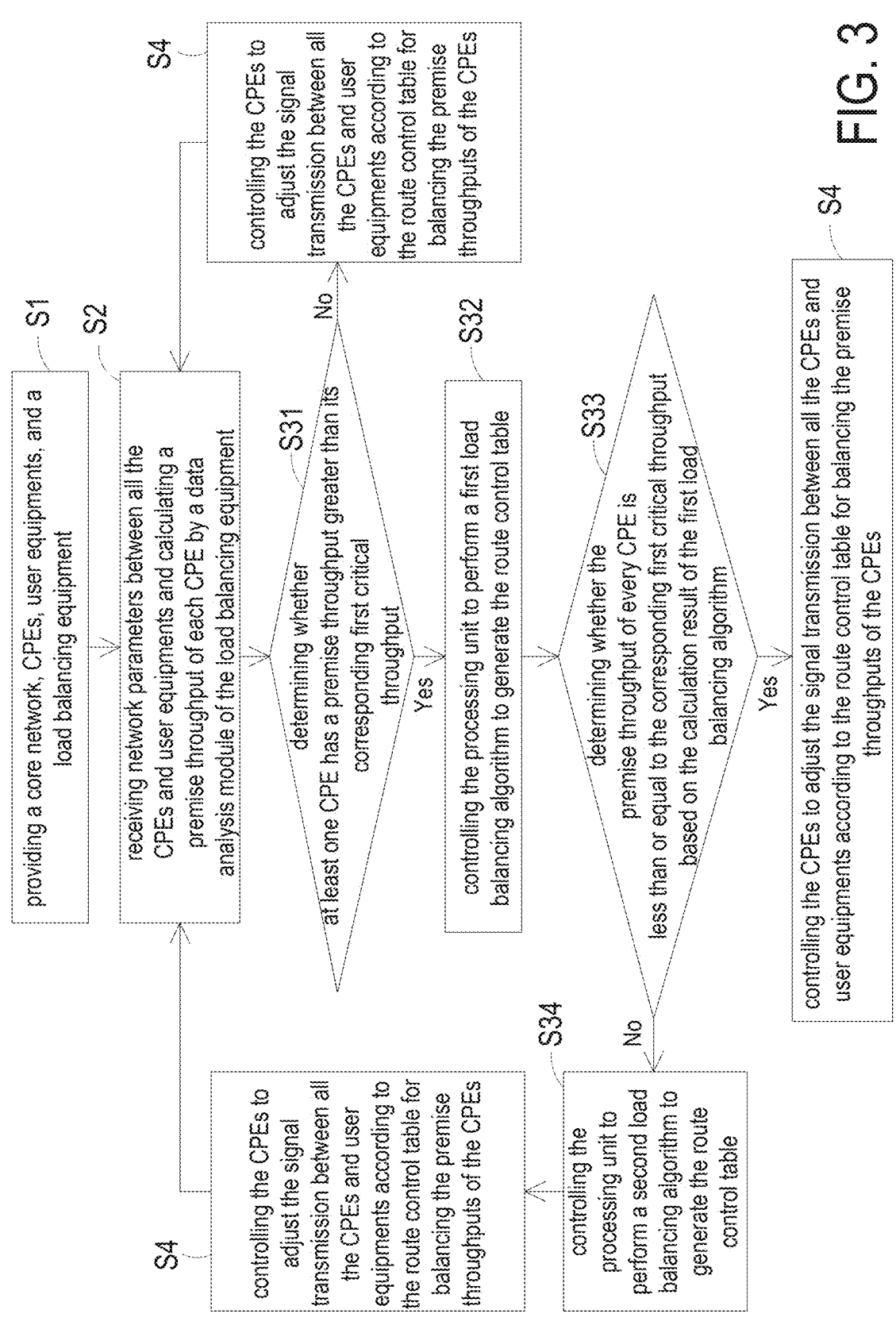

providing a core network, CPEs, user equipments, and a load balancing equipment — S1 receiving network parameters between all the CPEs and user equipments and calculating a premise throughput of each CPE by a data analysis module of the load balancing equipment — S2 determining whether at least one CPE has a premise throughput greater than its corresponding first critical throughput — S31

No — controlling the CPEs to adjust the signal transmission between all the CPEs and user equipments according to the route control table for balancing the premise throughputs of the CPEs — S4

Yes — controlling the processing unit to perform a first load balancing algorithm to generate the route control table — S32 determining whether the premise throughput of every CPE is less than or equal to the corresponding first critical throughput based on the calculation result of the first load balancing algorithm — S33

Yes — controlling the CPEs to adjust the signal transmission between all the CPEs and user equipments according to the route control table for balancing the premise throughputs of the CPEs — S4

No — controlling the processing unit to perform a second load balancing algorithm to generate the route control table — S34 controlling the CPEs to adjust the signal transmission between all the CPEs and user equipments according to the route control table for balancing the premise throughputs of the CPEs — S4

FIG. 3

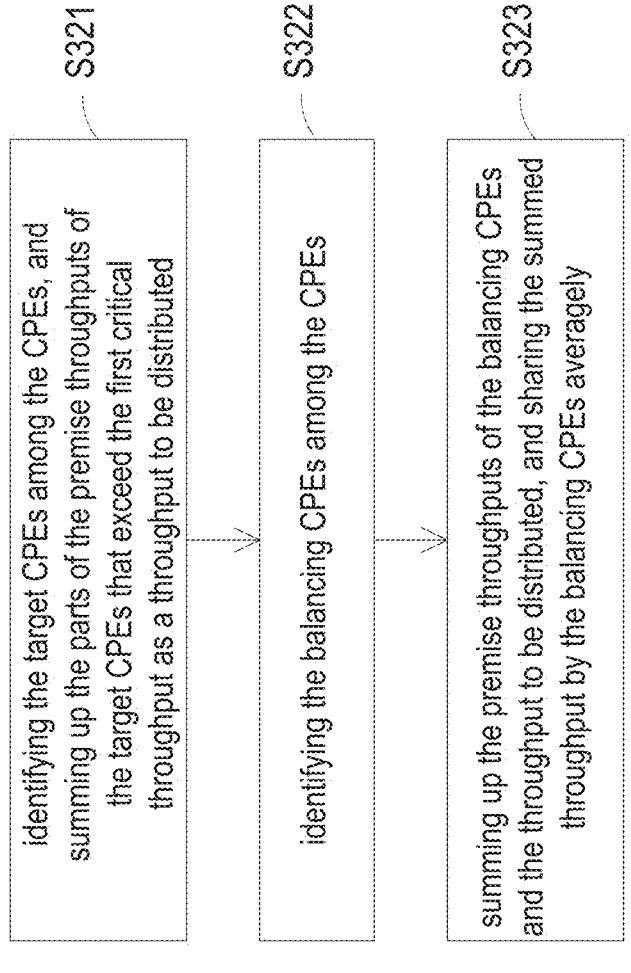

identifying the target CPEs among the CPEs, and summing up the parts of the premise throughputs of the target CPEs that exceed the first critical throughput as a throughput to be distributed

S321 identifying the balancing CPEs among the CPEs

S322 summing up the premise throughputs of the balancing CPEs and the throughput to be distributed, and sharing the summed throughput by the balancing CPEs averagely

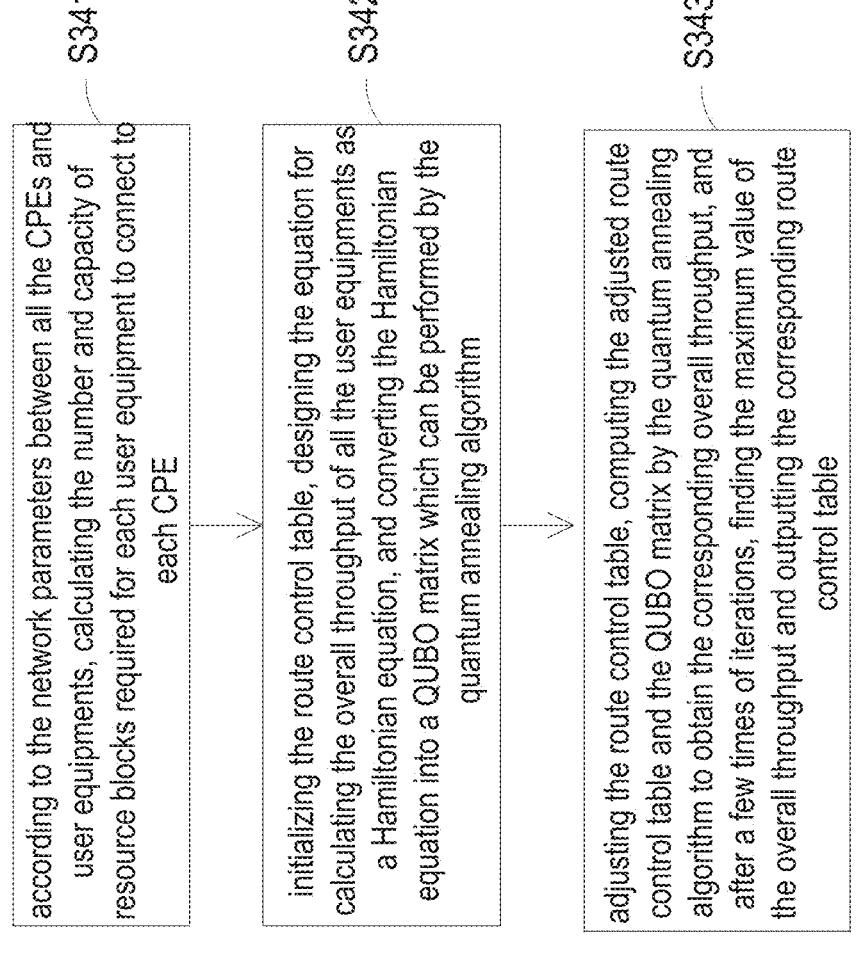

S341 according to the network parameters between all the CPEs and user equipments, calculating the number and capacity of resource blocks required for each user equipment to connect to each CPE

S342 initializing the route control table, designing the equation for calculating the overall throughput of all the user equipments as a Hamiltonian equation, and converting the Hamiltonian equation into a QUBO matrix which can be performed by the quantum annealing algorithm

S343 adjusting the route control table, computing the adjusted route control table and the QUBO matrix by the quantum annealing algorithm to obtain the corresponding overall throughput, and after a few times of iterations, finding the maximum value of the overall throughput and outputting the corresponding route control table

LOAD BALANCING SYSTEM AND METHOD

CROSS-REFERENCE TO RELATED APPLICATION

This application claims priority to Taiwan Patent Application No. 113104744 filed on Feb. 6, 2024. The entire contents of the above-mentioned patent application are incorporated herein by reference for all purposes.

FIELD OF THE INVENTION

The present disclosure relates to a load balancing system and method, and more particularly to a load balancing system and method capable of allocating the load through communication between customer premise equipments.

BACKGROUND OF THE INVENTION

With the development of technology, more and more devices have networking function, such as smartphones, computers, televisions and drones, and the content that can be uploaded and downloaded by devices also become more and more diverse. Taking the 5G network field as an example, 5G CPE (customer premise equipment) is used to enable more local devices to access the internet. However, this may lead to overload of the server of base station due to the simultaneous transmission of large amounts of data or information, resulting in problems like transmission failure, disconnection, or even server malfunction.

There are many conventional methods for solving server overload issues. However, in the conventional methods, when a certain CPE is connected to too many local devices, the load cannot be shared by other CPEs since the CPEs are not connected to each other. Under this circumstance, if the load balancing cannot be done at the backend, the server overload issue still cannot be solved.

Therefore, there is a need of providing a load balancing system and method in order to overcome the drawbacks of the conventional technologies.

SUMMARY OF THE INVENTION

The present disclosure provides a load balancing system and method. In the load balancing system and method, CPEs (customer premise equipments) are in communication with each other, and a load balancing equipment is connected to any of the CPEs to acquire a throughput of every CPE. When the throughput of a certain CPE is too large, the load balancing equipment performs optimization calculation in real time to distribute some data to other CPEs through the communication between the CPEs. Consequently, resources can be redistributed effectively, the utilization efficiency of overall network bandwidth is improved, and problems caused by a lot connections and throughputs at the same time are prevented.

In accordance with an aspect of the present disclosure, a load balancing system is provided. The load balancing system includes a core network, a plurality of CPEs, a plurality of user equipments, and a load balancing equipment. The plurality of CPEs receive signals from the core network and connect to each other through a network topology. The plurality of user equipments are connected to the plurality of CPEs. The load balancing equipment is connected to one of the plurality of CPEs, and the load balancing equipment confirms a throughput limit of each of the plurality of CPEs and includes a data analysis module and a processing unit. The data analysis module receives network parameters between the plurality of CPEs and the plurality of user equipments, and calculates premise throughputs of the plurality of CPEs. The processing unit generates a route control table according to the premise throughputs of the plurality of CPEs. According to the route control table, the plurality of CPEs adjusts signal transmission between the plurality of CPEs and the plurality of user equipments to balance the premise throughputs of the plurality of CPEs.

In accordance with another aspect of the present disclosure, a load balancing method is provided. The load balancing method includes steps of: (a) providing a core network, a plurality of CPEs, a plurality of user equipments and a load balancing equipment, wherein the plurality of CPEs receive signals from the core network and connect to each other through a network topology, the plurality of user equipments are connected to the plurality of CPEs, and the load balancing equipment is connected to one of the plurality of CPEs and confirms a throughput limit of each of the plurality of CPEs; (b) receiving network parameters between the plurality of CPEs and the plurality of user equipments and calculating premise throughputs of the plurality of CPEs by a data analysis module of the load balancing equipment; (c) generating a route control table according to the premise throughputs of the plurality of CPEs by a processing unit of the load balancing equipment; and (d) according to the route control table, controlling the plurality of CPEs to adjust signal transmission between the plurality of CPEs and the plurality of user equipments to balance the premise throughputs of the plurality of CPEs.

The above contents of the present disclosure will become more readily apparent to those ordinarily skilled in the art after reviewing the following detailed description and accompanying drawings, in which:

BRIEF DESCRIPTION OF THE DRAWINGS

FIG. 2 is a schematic flow chart illustrating a load balancing method according to an embodiment of the present disclosure;

FIG. 3 is a schematic flow chart showing a variant of the load balancing method of FIG. 2;

FIG. 4 schematically shows specific steps of the first load balancing algorithm; and FIG. 5 schematically shows specific steps of the second load balancing algorithm.

DETAILED DESCRIPTION OF THE PREFERRED EMBODIMENT

Figure 1:
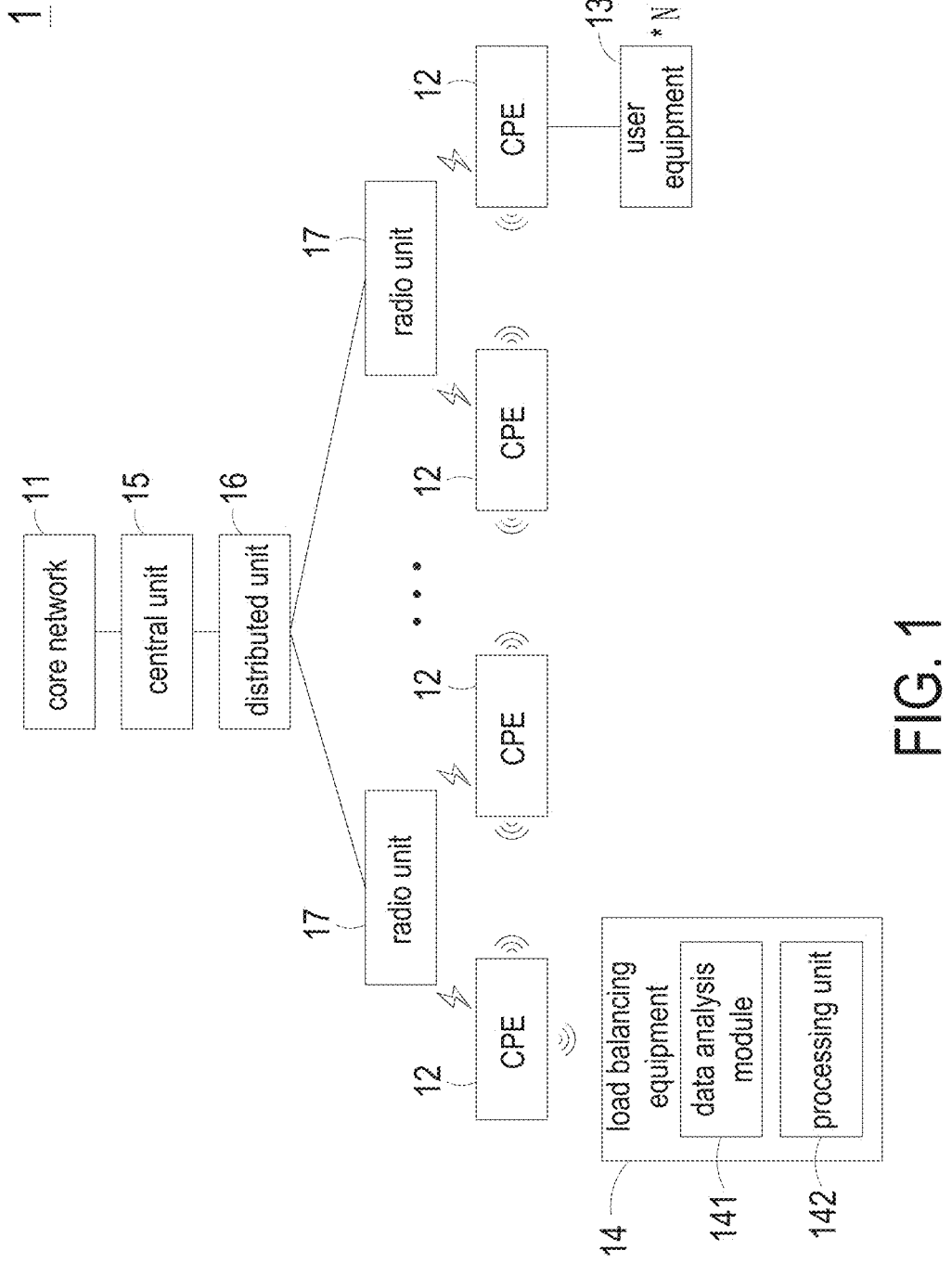
FIG. 1 is a schematic block diagram illustrating a load balancing system according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

FIG. 1 is a schematic block diagram illustrating a load balancing system according to an embodiment of the present disclosure. As shown in FIG. 1, the load balancing system 1 includes a core network 11, a plurality of CPEs (customer premise equipments) 12, a plurality of user equipments 13 (represented by N user equipments 13 in the figure, where N is an integer greater than 1), and a load balancing equipment 14. In an embodiment, the load balancing system 1 is applied to a 5G network, and correspondingly the core network 11 is a 5G core network.

The plurality of CPEs 12 receive signals from the core network 11. Further, the plurality of CPEs 12 are connected to each other through network topology so that the plurality of CPEs 12 are in communication with each other. For example, the CPE 12 may be a router, a switch or a set-top box, but not limited thereto. It is noted that the plurality of CPEs 12 in the figure communicate with each other through wireless connection, but the present disclosure is not limited thereto. Specifically, the plurality of CPEs 12 may communicate with each other through wired connection. Alternatively, some CPEs 12 may communicate with each other through wireless connection, while the other CPEs 12 may communicate with each other through wired connection. In addition, the wireless connection may use Wi-Fi frequency such as 2.4 GHz, 5 GHz, or 6 GHz, but not exclusively.

The plurality of user equipments 13 are connected to the plurality of CPEs 12. In the example shown in FIG. 1, the plurality of user equipments 13 are all connected to the same CPE 12. However, in actual applications, the specific connection relations between the plurality of user equipments 13 and the plurality of CPEs 12 are not limited. The user equipment 13 may be any electronic device with communication capability, for example but not limited to a smartphone, a laptop, or a network surveillance camera.

The load balancing equipment 14 is connected to any of the plurality of CPEs 12 to confirm a throughput limit of each CPE 12, and the load balancing equipment 14 includes a data analysis module 141 and a processing unit 142. The load balancing equipment 14 may be any equipment with the capability of parallel computing, for example but not limited to a server, a desktop computer, or a laptop. It is noted that in the figure, the load balancing equipment 14 is connected to the CPE 12 through wireless connection, but the present disclosure is not limited thereto. In another embodiment, the load balancing equipment 14 may be connected to the CPE 12 through wired connection. The data analysis module 141 receives network parameters between all the CPEs 12 and all the user equipments 13, and calculates a premise throughput of each CPE 12. The network parameter may include an RSRP (reference signal received power) and an SINR (signal to interference plus noise ratio), but not exclusively. The processing unit 142 generates a route control table according to the premise throughputs of all the CPEs 12. According to the route control table, the plurality of CPEs 12 adjust the signal transmission between all the CPEs 12 and all the user equipments 13 to balance the premise throughputs of the plurality of CPEs 12. The processing unit 142 may include a CPU, a GPU or an FPGA, but not exclusively. The route control table is formed based on a transmission value of each CPE 12 to other CPE 12. A larger transmission value means that the probability of transmitting the load of this CPE 12 to other CPE 12 is larger.

For example, in the specific process, when the system initializes, the load balancing equipment 14 confirms the throughput limits of all the CPEs 12. Then, the load balancing equipment 14 periodically sends requests (i.e., polling) to obtain the network parameters between all the CPEs 12 and all the user equipments 13. According to the obtained network parameters, the data analysis module 141 calculates the number and capacity of resource blocks and the user throughput required for each user equipment 13 to connect to each CPE 12, and further calculates the premise throughput of each CPE 12 accordingly. According to the premise throughput of each CPE 12, the processing unit 142 performs an algorithm to generate the route control table. An example of the data analysis module 141 calculating the premise throughput is exemplified as follows:

$$tp = \sum\nolimits_{n=1}^{N}(C_n * RB_n * k)$$

In this equation, tp is the premise throughput, $C_n$ is the capacity of resource block required for the nth user equipment 13 to connect to the CPE 12, $RB_n$ is the number of resource blocks required for the nth user equipment 13 to connect to the CPE 12, and k is a constant.

Consequently, when the throughput of a certain CPE 12 is too large, the load balancing equipment 14 performs optimization calculation in real time to distribute some data to other CPEs 12 through the communication between the CPEs 12. Therefore, resources can be redistributed effectively, the utilization efficiency of overall network bandwidth is improved, and problems caused by a lot connections and throughputs at the same time are prevented.

In some embodiments, the load balancing system 1 further includes a central unit 15, a distributed unit 16 and a plurality of radio units 17. The central unit 15 is connected to the core network 11, and the distributed unit 16 is connected between the central unit 15 and the plurality of radio units 17. The radio unit 17 is configured to provide signals to the corresponding CPEs 12.

The specific operation process of the load balancing system 1 would be described as follows according to a flow chart. FIG. 2 is a schematic flow chart illustrating a load balancing method according to an embodiment of the present disclosure. It is noted that all the load balancing methods described later can be applied to the load balancing system 1 of the present disclosure. As shown in FIG. 2, firstly, a core network 11, a plurality of CPEs 12, a plurality of user equipments 13, and a load balancing equipment 14 are provided (step S1). Then, a data analysis module 141 of the load balancing equipment 14 is utilized to receive network parameters between all the CPEs 12 and all the user equipments 13 and to calculate a premise throughput of each CPE 12 (step S2). Afterwards, a processing unit 142 of the load balancing equipment 14 is utilized to generate a route control table according to the premise throughputs of all the CPEs 12 (step S3). Finally, the plurality of CPEs 12 are controlled to adjust the signal transmission between all the CPEs 12 and all the user equipments 13 according to the route control table so as to balance the premise throughputs of the plurality of CPEs 12 (step S4).

FIG. 3 is a schematic flow chart showing a variant of the load balancing method of FIG. 2. In an embodiment, as shown in FIG. 3, the step S3 further includes steps S31 and S32. After performing the step S2, in the step S31, it is determined whether at least one CPE 12 has a premise throughput greater than its corresponding first critical throughput. The first critical throughput is calculated as the product of the throughput limit of the CPE 12 and a first percentage, and the first percentage is for example but not limited to 80%. Thereby, whether the premise throughput of any CPE 12 is too large is determined. If the determination result of the step S31 is negative, it means that the premise throughputs of all the CPE 12 are within an acceptable range, and the step S4 is performed. Alternatively, if the determination result of the step S31 is positive, it means that the premise throughput of at least one CPE 12 is too large, and the step S32 is performed. In the step S32, the processing unit 142 is controlled to perform a first load balancing algorithm to generate the route control table.

The first load balancing algorithm is a rule-based algorithm. In the first load balancing algorithm, the processing unit 142 regards the CPE 12 having the premise throughput greater than the first critical throughput as a target CPE, and regards the CPE 12 having the premise throughput less than a second critical throughput as a balancing CPE. The processing unit 142 calculates to make all the balancing CPEs share the premise throughputs of all the balancing CPEs and the difference between the premise throughput of the target CPE and the first critical throughput averagely. The second critical throughput is calculated as the product of the throughput limit of the CPE 12 and a second percentage, and the second percentage is less than the first percentage and is for example but not limited to 50%.

FIG. 4 schematically shows specific steps of the first load balancing algorithm. As shown in FIG. 4, firstly, the target CPEs among the CPEs 12 are identified, and the parts of the premise throughputs of the target CPEs that exceed the first critical throughput are summed up as a throughput to be distributed (step S321). Next, the balancing CPEs among the CPEs 12 are identified (step S322). Finally, the premise throughputs of the balancing CPEs and the throughput to be distributed are summed up, and the summed throughput is shared by the balancing CPEs averagely (step S323). The formula for allocating throughput is exemplified as follows:

$$tp_{re} = \sum\nolimits_{i=1}^{I} [(tp_i - \text{MAX} tp_i * 0.8) * a_i + tp_i * b_i] \Big/ \sum\nolimits_{i=1}^{I} (b_i) \quad (1)$$

In equation (1), $tp_{re}$ is the throughput distributed to each balancing CPE, I is the number of CPEs 12, $tp_i$ is the premise throughput of the ith CPE 12, $\text{MAX} tp_i$ is the throughput limit of the ith CPE 12, and $a_i$ and $b_i$ are binary. If the premise throughput of the ith CPE 12 is greater than the corresponding first critical throughput, $a_i$ equals 1; otherwise, $a_i$ equals 0. If the premise throughput of the ith CPE 12 is less than the corresponding second critical throughput, $b_i$ equals 1; otherwise, $b_i$ equals 0.

Please refer to FIG. 3 again. In an embodiment, as shown in FIG. 3, the step S3 further includes steps S33 and S34. After performing the step S32, in the step S33, whether the premise throughput of every CPE 12 is less than or equal to the corresponding first critical throughput is determined based on the calculation result of the first load balancing algorithm. If the determination result of the step S33 is positive, the step S4 is performed. Under this circumstance, the processing unit 142 outputs the route control table generated by performing the first load balancing algorithm. If the determination result of the step S33 is negative, the step S34 is performed. In the step S34, the processing unit 142 is controlled to perform a second load balancing algorithm to generate the route control table. Then, the step S4 is performed to achieve load balancing. Under this circumstance, the processing unit 142 outputs the route control table generated by performing the second load balancing algorithm.

The second load balancing algorithm is a quantum annealing algorithm. In the second load balancing algorithm, the processing unit 142 obtains a QUBO matrix according to the network parameters and adjusts the route control table. By using the quantum annealing algorithm, the processing unit 142 computes the adjusted route control table and the QUBO matrix to obtain an overall throughput of all the user equipments 13. After a few times of iterations, the processing unit 142 obtains a maximum value of the overall throughput and outputs the corresponding route control table.

FIG. 5 schematically shows specific steps of the second load balancing algorithm. As shown in FIG. 5, firstly, according to the network parameters between all the CPEs 12 and all the user equipments 13, the number and capacity of resource blocks required for each user equipment 13 to connect to each CPE 12 are calculated (step S341), and the equation used for calculation is exemplified as follows:

$$C = \log_2\left(1 + 10^{\left(\frac{SINR}{10}\right)}\right) \quad (2)$$

$$RB = (DE + t_{slot}) / (RE * C) \quad (3)$$

In equations (2) and (3), C is the capacity of resource block required for the user equipment 13 to connect to the CPE 13, RB is the number of resource blocks required for the user equipment 13 to connect to the CPE 13, DE is the throughput required by the user equipment 13, $t_{slot}$ is the time slot of allocating resources, and RE is the number of resource elements.

Then, the route control table is initialized, the equation for calculating the overall throughput of all the user equipments 13 is designed as a Hamiltonian equation, and the Hamiltonian equation is converted into a QUBO matrix which can be performed by the quantum annealing algorithm (step S342). The Hamiltonian equation is exemplified as follows:

$$H = \sum\nolimits_{j=1}^{J} \sum\nolimits_{i=1}^{I} (RB_{ij} * x_{ij} * RE * C_{ij}) \quad (4)$$

In equation (4), J is the number of user equipments 13, $RB_{ij}$ is the number of resource blocks required for the jth user equipment 13 to connect to the ith CPE 12, $C_{ij}$ is the capacity of resource block required for the jth user equipment 13 to connect to the ith CPE 12, and $x_{ij}$ is binary. $x_{ij}$ equals 1 if the jth user equipment 13 is connected to the ith CPE 12, and alternatively, $x_{ij}$ equals 0 if the jth user equipment 13 is not connected to the ith CPE 12.

Afterwards, in the step S343, the route control table is adjusted, and the adjusted route control table and the QUBO matrix are computed by the quantum annealing algorithm to obtain the corresponding overall throughput. At this time, the processing unit 142 may utilize parallel computing to accelerate the computing process. After each iteration, it is determined whether the obtained overall throughput is greater than the current maximum overall throughput. If yes, the corresponding route control table is recorded. After a few times of iterations, the maximum value of the overall throughput can be found, and the corresponding route control table is outputted, thereby realizing the maximization of overall throughput.

Please refer to FIG. 3 again. For ease of understanding the load balancing method shown in FIG. 3, two practical application scenarios are exemplified below.

In the first practical application scenario, there are four CPEs 12, which are CPE1, CPE2, CPE3 and CPE4, the first percentage is 80%, and the second percentage is 50%. The throughput limit of CPE1 is 300 Mbps, and the throughput limits of CPE2, CPE3 and CPE4 are all 100 Mbps. Currently, the premise throughput of CPE1 is 300 Mbps, the premise throughput of CPE2 is 70 Mbps, and the premise throughputs of CPE3 and CPE4 are both 40 Mbps. Since the premise throughput of CPE1 exceeds its corresponding first critical throughput (=300 Mbps*80%=240 Mbps), the determination result of the step S31 is positive, and the first load balancing algorithm is performed accordingly. According to FIG. 4, in the step S321, CPE1 is identified as a target CPE, and the throughput to be distributed is the part of CPE1's CPE that exceeds the corresponding first critical throughput (=300 Mbps-240 Mbps=60 Mbps). Then, in the step S322, since the premise throughputs of CPE3 and CPE4 are both less than the corresponding second critical throughput (=100 Mbps*50%=50 Mbps), CPE3 and CPE4 are identified as balancing CPEs. Finally, in the step S323, the premise throughput of CPE3 (40 Mbps), the premise throughput of CPE4 (40 Mbps), and the throughput to be distribute (60 Mbps) are summed up, and the summed throughput (=40 Mbps+40 Mbps+60 Mbps=140 Mbps) is distributed to CPE3 and CPE4 averagely. Consequently, if the signal transmission between the CPEs 12 is adjusted according to the route control table obtained by performing the first load balancing algorithm, the premise throughputs of CPE1, CPE2, CPE3 and CPE4 would be 240 Mbps, 70 Mbps, 70 Mbps and 70 Mbps respectively, which are less than the corresponding first critical throughputs respectively. Accordingly, the determination result of the step S33 in FIG. 3 is positive, and the step S4 is performed.

In the second practical application scenario, there are four CPEs 12, which are CPE5, CPE6, CPE7 and CPE8, the first percentage is 80%, and the second percentage is 50%. The throughput limit of CPE5 is 400 Mbps, and the throughput limits of CPE6, CPE7 and CPE8 are all 100 Mbps. Currently, the premise throughput of CPE5 is 400 Mbps, the premise throughput of CPE6 is 70 Mbps, and the premise throughputs of CPE7 and CPE8 are both 45 Mbps. Since the premise throughput of CPE5 exceeds its corresponding first critical throughput (=400 Mbps*80%=320 Mbps), the determination result of the step S31 is positive, and the first load balancing algorithm is performed accordingly. According to FIG. 4, in the step S321, CPE5 is identified as a target CPE, and the throughput to be distributed is the part of CPE5's CPE that exceeds the corresponding first critical throughput (=400 Mbps-320 Mbps=80 Mbps). Then, in the step S322, since the premise throughputs of CPE7 and CPE8 are both less than the corresponding second critical throughput (=100 Mbps*50%=50 Mbps), CPE7 and CPE8 are identified as balancing CPEs. Finally, in the step S323, the premise throughput of CPE7 (45 Mbps), the premise throughput of CPE8 (45 Mbps), and the throughput to be distributed (80 Mbps) are summed up, and the summed throughput (=45 Mbps+45 Mbps+80 Mbps=170 Mbps) is distributed to CPE7 and CPE8 averagely. If the signal transmission between the CPEs 12 is adjusted according to the route control table obtained by performing the first load balancing algorithm, the premise throughputs of CPE5, CPE6, CPE7 and CPE8 would be 320 Mbps, 70 Mbps, 85 Mbps and 85 Mbps respectively. It is noted that the premise throughputs of CPE7 and CPE8 are greater than the corresponding first critical throughputs respectively. Accordingly, the determination result of the step S33 in FIG. 3 is negative, and the steps S34 and S4 are performed to distribute loads between the CPEs 12 according to the route control table obtained by performing the second load balancing algorithm so that the maximization of overall throughput is realized.

In summary, the present disclosure provides a load balancing system and method. In the load balancing system and method, CPEs are in communication with each other, and a load balancing equipment is connected to any of the CPEs to acquire a throughput of every CPE. When the throughput of a certain CPE is too large, the load balancing equipment performs optimization calculation in real time to distribute some data to other CPEs through the communication between the CPEs. Consequently, resources can be redistributed effectively, the utilization efficiency of overall network bandwidth is improved, and problems caused by a lot connections and throughputs at the same time are prevented. In addition, corresponding to different load conditions, different load balancing algorithms are used to realize load balance. Consequently, the applicability of the load balancing system and method is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A load balancing system, comprising:
   a core network;
      a plurality of CPEs (customer premise equipments), receiving signals from the core network, and connecting to each other through a network topology;
      a plurality of user equipments, connected to the plurality of CPEs; and
      a load balancing equipment, connected to one of the plurality of CPEs, confirming a throughput limit of each of the plurality of CPEs, and comprising:
      a data analysis module, receiving network parameters between the plurality of CPEs and
      the plurality of user equipments, and calculating premise throughputs of the plurality of CPEs based on the network parameters;
      wherein the network parameters comprise reference signal received powers (RSRP) and signal to interference plus noise ratios (SINR); and
      a processing unit, generating a route control table according to the premise throughputs of the plurality of CPEs, wherein according to the route control table, the plurality of CPEs adjusts signal transmission between the plurality of CPEs and the plurality of user equipments to balance the premise throughputs of the plurality of CPEs,
      wherein the processing unit of the load balancing equipment performs a first load balancing algorithm to generate the route control table, wherein in the first load balancing algorithm, the processing unit regards a CPE with a premise throughput greater than a first critical throughput as a target CPE from the plurality of CPEs;
      the processing unit regards a CPE with a premise throughput less than a second critical throughput as a balancing CPE from the plurality of CPEs; and
      the processing unit calculates to make the balancing CPE share a sum of the premise throughput of the balancing CPE and a throughput determined by a difference between the premise throughput of the target CPE and the first critical throughput.

2. The load balancing system according to claim 1, wherein the plurality of CPEs communicate with each other through wired connection and/or wireless connection.

3. The load balancing system according to claim 1, wherein the load balancing equipment is connected to the one of the plurality of CPEs through wired or wireless connection.

4. The load balancing system according to claim 1, wherein the data analysis module calculates a number and capacity of resource blocks and a user throughput required for each of the plurality of user equipments to connect to each of the plurality of CPEs, and calculates the premise throughputs of the plurality of CPEs accordingly.

5. The load balancing system according to claim 1, wherein according to a calculation result of the first load balancing algorithm, the processing unit determines whether the premise throughputs of the plurality of CPEs are all less than or equal to corresponding first critical throughputs respectively, and if a determination result is positive, the processing unit outputs the route control table generated by performing the first load balancing algorithm.

6. The load balancing system according to claim 5, wherein the processing unit performs a second load balancing algorithm to adjust the route control table if the determination result is negative, wherein in the second load balancing algorithm, the processing unit obtains a QUBO matrix according to the network parameters, adjusts the route control table, and computes the route control table and the QUBO matrix to obtain an overall throughput of the plurality of user equipments by using a quantum annealing algorithm, and after multiple times of iterations, the processing unit obtains a maximum value of the overall throughput and outputs the route control table.

7. The load balancing system according to claim 1, wherein the first critical throughput is a product of the throughput limit and a first percentage, the second critical throughput is a product of the throughput limit and a second percentage, and the first percentage is greater than the second percentage.

8. The load balancing system according to claim 7, wherein the first percentage is 80%, and the second percentage is 50%.

9. A load balancing method, comprising steps of:
  (a) providing a core network, a plurality of CPEs, a plurality of user equipments and a load balancing equipment, wherein the plurality of CPEs receive signals from the core network and connect to each other through a network topology, the plurality of user equipments are connected to the plurality of CPEs, and the load balancing equipment is connected to one of the plurality of CPEs and confirms a throughput limit of each of the plurality of CPEs;
  (b) receiving network parameters between the plurality of CPEs and the plurality of user equipments and calculating premise throughputs of the plurality of CPEs by a data analysis module of the load balancing equipment based on the network parameters;
  wherein the network parameters comprise reference signal received powers (RSRP) and signalto interference plus noise ratios (SINR);
  (c) generating a route control table according to the premise throughputs of the plurality of CPEs by a processing unit of the load balancing equipment; and
  (d) according to the route control table, controlling the plurality of CPEs to adjust signal transmission between the plurality of CPEs and the plurality of user equipments to balance the premise throughputs of the plurality of CPEs;

wherein the step (c) comprises a sub-step of:
  (c1) controlling the processing unit of the load balancing equipment to perform a first load balancing algorithm to generate the route control table,
  wherein in the first load balancing algorithm, the processing unit regards a CPE with a premise throughput greater than a first critical throughput as a target CPE from the plurality of CPEs;
  the processing unit regards a CPE with a premise throughput less than a second critical throughput as a balancing CPE from the plurality of CPEs; and
  the processing unit calculates to make the balancing CPE share a sum of the premise throughput of the balancing CPE and a throughput determined by a difference between the premise throughput of the target CPE and the first critical throughput.

10. The load balancing method according to claim 9, wherein the plurality of CPEs communicate with each other through wired connection and/or wireless connection.

11. The load balancing method according to claim 9, wherein the load balancing equipment is connected to the one of the plurality of CPEs through wired or wireless connection.

12. The load balancing method according to claim 9, wherein in the step (b), the data analysis module calculates a number and capacity of resource blocks and a user throughput required for each of the plurality of user equipments to connect to each of the plurality of CPEs, and calculates the premise throughputs of the plurality of CPEs accordingly.

13. The load balancing method according to claim 9, wherein the step (c) further comprises sub-steps of:
  (c2) according to a calculation result of the first load balancing algorithm, determining whether the premise throughputs of the plurality of CPEs are all less than or equal to corresponding first critical throughputs respectively; and
  (c3) if a determination result of the sub-step (c2) is positive, controlling the processing unit to output the route control table generated by performing the first load balancing algorithm.

14. The load balancing method according to claim 13, wherein the step (c) further comprises a sub-step of:
  (c4) if the determination result of the sub-step (c2) is negative, controlling the processing unit to perform a second load balancing algorithm to adjust the route control table,
  wherein in the second load balancing algorithm, the processing unit obtains a QUBO matrix according to the network parameters, adjusts the route control table, and computes the route control table and the QUBO matrix to obtain an overall throughput of the plurality of user equipments by using a quantum annealing algorithm, and after multiple times of iterations, the processing unit obtains a maximum value of the overall throughput and outputs the route control table.

15. The load balancing method according to claim 9, wherein the first critical throughput is a product of the throughput limit and a first percentage, the second critical throughput is a product of the throughput limit and a second percentage, and the first percentage is greater than the second percentage.

16. The load balancing method according to claim 15, wherein the first percentage is 80%, and the second percentage is 50%.

* * * * *